No. 655,335. Patented Aug. 7, 1900.
E. M. FRASER.
MOTOR STARTER.
(Application filed Mar. 11, 1899.)
(No Model.) 2 Sheets—Sheet 1.

WITNESSES,
L. C. Fraser
F. L. Kincaid

INVENTOR
E. M. Fraser
by A. H. Ste. Marie
atty

No. 655,335. Patented Aug. 7, 1900.
E. M. FRASER.
MOTOR STARTER.
(Application filed Mar. 11, 1899.)
(No Model.) 2 Sheets—Sheet 2.
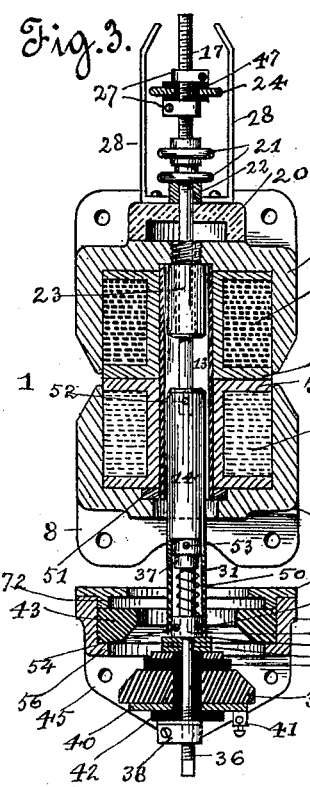
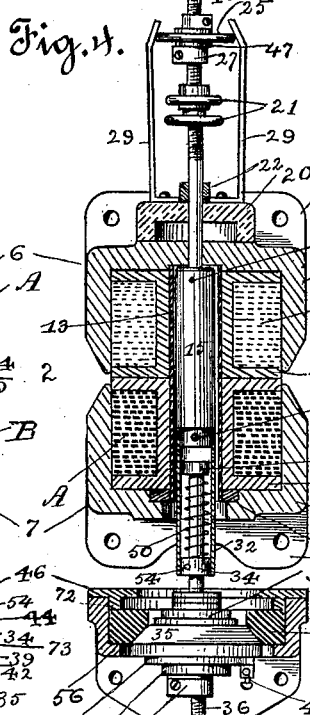
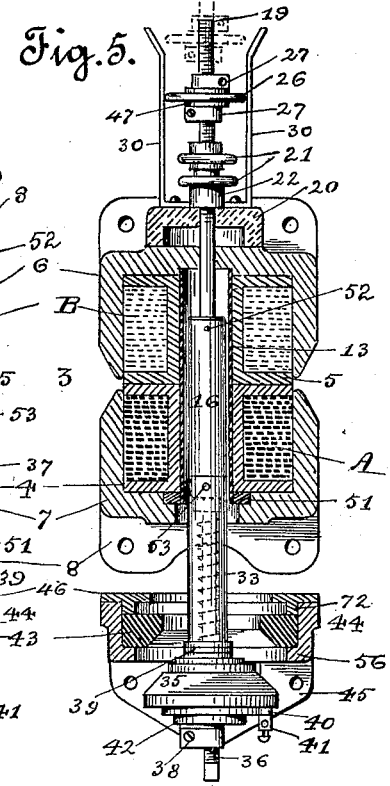
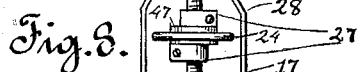
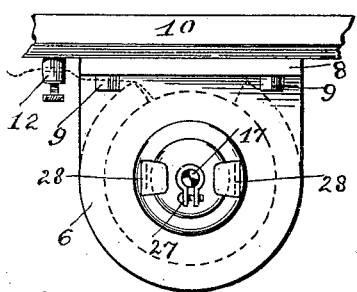
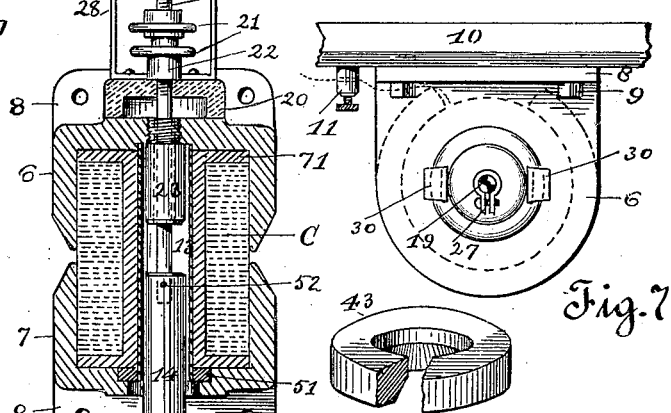
Witnesses. Inventor.
Ethelbert M. Fraser
by A. H. Ste Marie, atty

UNITED STATES PATENT OFFICE.

ETHELBERT M. FRASER, OF SAN FRANCISCO, CALIFORNIA, ASSIGNOR, BY MESNE ASSIGNMENTS, TO THE OTIS ELEVATOR COMPANY, OF NEW JERSEY.

MOTOR-STARTER.

SPECIFICATION forming part of Letters Patent No. 655,335, dated August 7, 1900.

Application filed March 11, 1899. Serial No. 708,773. (No model.)

*To all whom it may concern:*

Be it known that I, ETHELBERT M. FRASER, of the city and county of San Francisco, State of California, have invented certain new and useful Improvements in Motor-Starters, of which the following is a specification.

This invention relates to devices for graduating and regulating the flow of current of electricity to motors when said motors are being started in motion.

My object is to provide an automatic means for starting electric motors gradually and safely regardless of the manner in which the person in charge may close the operating-switch—that is, although the switch may be closed suddenly and carelessly still the motor will start smoothly and quickly, but not with a jerk. When the current is turned off, it will stop as smoothly and as quickly as it started.

My invention was brought forth by the necessity of having a better method of starting electric motors, and particularly those used on elevators and street-cars, without the jar attendant upon a sudden start and without wrenching the machinery by suddenly throwing the full strength of the current into the motor. Usually the persons who operate these motors are boys or men with but little education in electricity, and consequently they throw the starting-switch entirely on at the first movement, but with my invention this makes no difference, because I have provided resistances that make the current to the motor weak at first. Automatically these resistances are cut out one after the other, and consequently the current delivered stronger and stronger to the motor until in a very short time after the current is turned on it is being delivered to the motor in full force.

Figure 1:
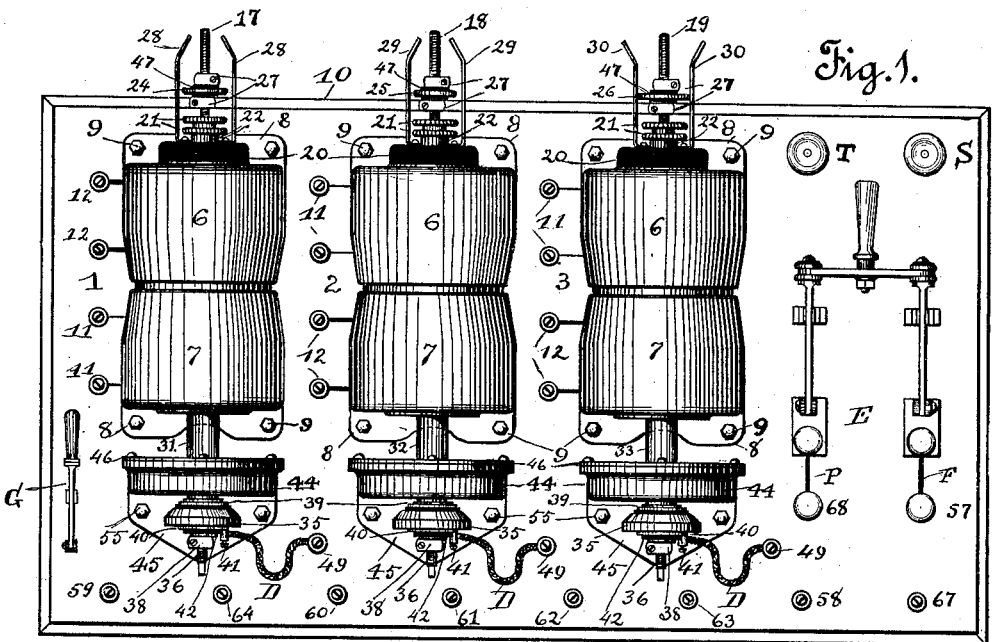
Figure 2:
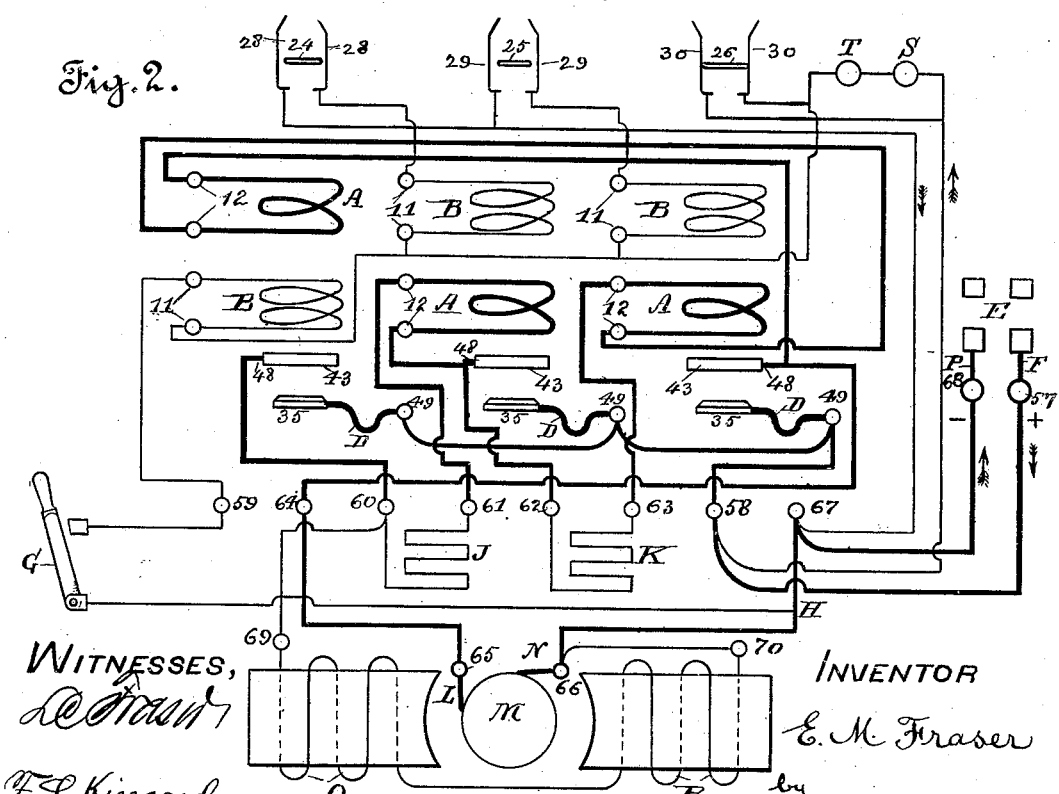

In the accompanying drawings, which form a part of this specification, Figure 1 is a front elevation, showing part of my starting device without the motor. In this view are seen three iron-clad solenoids and the wires connected with them, the starting-switch on the left and an ordinary knife-switch on the right, all secured to a slab of slate or marble. Fig. 2 is a diagram showing the course of the main and shunt currents through the motor and my starting device. The main current is represented by the heavy lines and the shunt-currents by the lighter lines. Fig. 3 is a sectional elevation of the first or left-hand solenoid shown in Fig. 1. Fig. 4 is a sectional elevation of the second solenoid from the left as shown in Fig. 1, the middle one. Fig. 5 is a sectional elevation of the third or right-hand solenoid shown in Fig. 1. Fig. 6 is a top view of the first or left-hand solenoid. Fig. 7 is a top view of the third or right-hand solenoid. Fig. 8 is a sectional elevation of a solenoid similar in construction to that shown in Fig. 3, except that it has but a single coil instead of two coils, as shown in Fig. 3. Fig. 9 is a perspective view of a contact-piece shaped like a truncated cone-valve, located at the lower end of the core of each of the solenoids. Fig. 10 is a broken perspective of a carbon ring shaped like the seat of a cone-valve used in connection with the valve-shaped contact-piece shown in Fig. 9.

Similar letters and numerals of reference refer to similar parts in all the figures, and where the corresponding parts in all the solenoids are exactly alike but one reference letter or numeral is used to refer to them all.

My starter complete comprises three double solenoids, respectively numbered 1, 2, and 3. Two, however, are sufficient for small loads, in which case the middle one, No. 2, would be omitted. For heavy work more than three can be used. My invention is not limited to any particular number of solenoids, it all depending on whether the work to be done by the motor is light or heavy. As shown in Figs. 2, 3, 4, and 5, each of these solenoids consists of two coils A and B of insulated copper wire, coil A being of heavier wire than coil B, and each coil is on a separate spool 4 and 5 and placed one above the other around the core of the solenoid to which they respectively belong. Solenoid 1 has its coil of larger wire on its spool 4 above its coil of smaller wire on spool 5, as shown in Figs. 2 and 3. Solenoids 2 and 3 have their coils A of larger wire on similar spools below their coils B of small wire. The spools 4 and 5, around which the coils of large and small wire are respectively wrapped, are no essential part of my invention and might be dispensed with, if desired; but I prefer them, because they keep the coils intact and keep the coil of large wire neatly separated from the coil of small wire in each solenoid. The two spools in each solenoid are placed in an iron casing, which is cast in two parts—upper 6 and lower 7. The said upper part 6 and lower part 7 of each of these iron casings do not come quite together in the middle of their solenoids, but leave a small space, as shown in Figs. 1, 3, 4, and 5, so that the solenoid may be taken apart and the spools easily removed when desired. The upper end of the upper half and the lower end of the lower half of each of said solenoid-casings are provided with a flange and lugs 8, with holes in them to receive screws or bolts 9, which bolts secure said solenoids vertically to the slate or marble board 10 upon which they are supported. This slate or marble board 10 is fixed to the wall on brackets, (brackets not shown in the accompanying drawings) and is usually located near the motor, but may be placed at any distance from it, the only difference being that if it is placed far away from the motor it requires longer wires to reach from the board to the motor. Each half of said casings is open in back, as shown in Figs. 6 and 7, so as to allow the wires to pass to and from the coil which is within each half-casing and connect with the binding-posts 11 and 12. The binding-posts of the small wires are represented by the reference-numeral 11 and those of the larger wires by the reference-numeral 12.

A brass tube or bushing 13 is placed in the bore of the spools 4 and 5 of each solenoid and extends from the top of the upper spool to the bottom of the lower spool. It is held up by a brass flange or ring 51 on the outside of its lower end, which said ring fits in a recess in the upper side of the lower end of the solenoid-casing. This tube is not an essential part of my invention, but it is better to have it than not, because it helps to hold the upper and lower coils in place and acts as a guide or cylinder for the plungers or cores of the respective solenoids to work in.

The purpose of each solenoid is to raise a soft-iron plunger or core. Each of the cores 14, 15, and 16 of the respective solenoids 1, 2, and 3 is made hollow in its upper end to receive the lower end of a separate rod, to which it is attached by means of a pin 52, which passes through the upper end of said plunger and through the said lower end of said rod. The rods of the solenoids 1, 2, and 3 are respectively referred to herein by the reference-numerals 17, 18, and 19. Each of said rods extends some distance upward through a hole made for the purpose in the top of the upper half 6 of the casing of each solenoid and through a similar hole in hard-rubber or lignum-vitæ insulation-cap 20, that fits upon the top of each solenoid-casing. Said rods and plungers attached are kept from falling by nuts 21, that engage screw-threads on the upper ends of said rods 17, 18, and 19. Said nuts 21 on each rod when the plunger is at rest bear upon a bumper 22, of soft rubber, and this bumper bears upon the insulation-cap 20 above described.

Solenoid 1 is different from the other two in this that its coil of large wire is above the coil of small wire and in that it has two cores—a main core 14 and a shorter core 23— also made of soft iron. The main core 14 is similar to the cores of the other two solenoids, except that it is hung lower on its supporting-rod 17. The shorter core 23 is secured within the tube 13 to the top of the casing of said solenoid 1 by screw-threads on a reduced part of said short core engaging similar screw-threads in the hole in said solenoid-casing that the rod 17 works in. This short core 23 is hollow to allow the rod 17 to pass through it, and the hole just referred to in the top of said solenoid-casing is made large to receive the upper end of said short core 23.

Contact-disks 24, 25, and 26 are secured, respectively, on the rods 17, 18, and 19 above the nuts 21, which support said rods, as before described. Each of these contact-disks is insulated from its rod and from the clamps 27 above and below it which hold it in position by rubber 47. The clamps 27 (best shown in Figs. 6 and 7) are all alike. One fits above and one below each of said disks, and they are adapted to be easily loosened and raised or lowered on their respective rods, according as it is desired to have the disk which they control high or low.

Two contact-springs 28, 29, and 30 are screwed to the top of each insulation-cap 20 on opposite sides of the rods 17, 18, and 19. The two springs on each solenoid are alike and all extend upward and parallel with their respective rods 17, 18, and 19. The upper ends of the springs 28 on solenoid 1 and 29 on solenoid 2 bend inward, so as to come in contact, respectively, with the disks 24 and 25 when said disks are raised by the plungers 14 and 15, to which they are respectively attached. When disks 24 and 25 are in their normal position, as shown in Fig. 3, they are out of contact with their contact-springs. The upper ends of the contact-springs 30 on solenoid 3 bend outward, and when their disk 26, which is diametrically wider than the disks of the other two solenoids, is in a state of rest it is in contact with said springs, but when raised it is out of contact.

Short brass tubes 31, 32, and 33 fit upon diminished portions of and are fastened to the lower ends of the respective plungers 14, 15, and 16 by pins 53, which pass through each of said tubes and through the diminished portion of the plunger to which it attaches. These tubes 31, 32, and 33 are of the same external diameter as the plungers to which they are respectively attached, and being pinned to their plunger work up and down in the bushing 13 with it. The tube 31 of solenoid 1 is shorter than tubes 32 and 33 of the solenoids 2 and 3 because of the space within the cylinder-tube 13 that is taken up by the short core 23.

A carbon contact-piece 35, shaped like a truncated cone-valve, is connected with the lower end of each of the plungers 14, 15, and 16, as follows: A rod 36, having a head 37 on its upper end, is located in each of the tubes 31, 32, and 33 last spoken of and extends downward some little distance below the lower end of the tube in which it works. Each of these rods 36 is yieldingly supported in its respective tube on a spiral spring 50, which is coiled around said rod and is seated above on the under side of the head 37 and below on a brass ring 34, provided in the lower end of each of the tubes 31, 32, and 33 and secured thereto by pins 54. One of the valve-shaped contact-pieces 35 is secured to the lower end of each of these spring-supported rods 36 by a clamp 38, that is secured to said rod 36 below said contact-piece, and by washers 39, that fit around said rod 36 above the contact-piece. The clamps 38 are similar in construction and operation to the clamps 27, which hold the upper contact-disks 24, 25, and 26 in position. It is not necessary to have clamps above these contact-pieces 35, because they are kept down by a shoulder 73 on rod 36. The number of washers 39 above each contact-piece is a matter of choice, their main purpose being to take up wear on the carbon as it becomes smaller by constant use.

A separate brass plate 40 fits against the under side of each of the carbon valve-shaped contact-pieces 35 and has a binding-post 41 projecting from its lower side. Each of these carbon contact-pieces 35, with its respective brass plate 40 attached, is insulated by a rubber, fiber, or mica insulation 42 from its rod 36 and from the clamp 38 below it and the washer 39 above it. One of these carbon contact-pieces is shown in perspective in Fig. 9.

In the operation of my invention, which will be hereinafter described, the coils of small wire B are first charged with electricity, and they magnetize and raise the soft-iron cores 14, 15, and 16 of the respective solenoids. In solenoid 1 the small coil is below and magnetizes the core 14, which is thereby impelled to the short core 23 above it. We then have the two cores 14 and 23 in contact, the positive end of one against the negative end of the other. Above this small coil B is the coil of heavier wire A. The purpose of this heavy series coil A is to hold up the first plunger 14 until the last plunger 16 goes up and so cuts it out. If it were not arranged in this manner and the first solenoid shunt-circuit were broken before the last plunger were to go up, it would break the heavy current flowing through the resistance. In solenoids 2 and 3 the coils B of small wire are above the coils A of large wire and their respective cores 15 and 16 are directly drawn up by the magnetism of these coils B of small wire.

When one of the cores 14, 15, or 16 is drawn up, as just described, the carbon valve-shaped contact-piece 35 that is connected with it is also drawn up and seated in a carbon ring 43, made to receive it, as shown in Fig. 4. These carbon rings (there being one for each solenoid) are made the shape of the seat of a cone-valve, as shown in broken perspective in Fig. 10. Each of these seat-like contact-carbons 43 is set in an iron holder 44, which holder is cast with a flange 45 on its lower end with holes in said flange to receive screws or bolts 55 to fasten it to the wall-board 10. The carbon ring 43 is secured in its iron holder 44 by a flange 56, projecting inward on the lower end of said holder, and a metal ring 46, screwed or bolted around the top of the iron holder and having a flange 72, adapted to fit firmly upon the top of said carbon ring. A binding-post 48 is electrically connected with each of said carbon rings 43 by being attached to the outside of the holders 44, which hold said rings.

A flexible wire D is attached to the binding-post 41 of each of the valve-shaped contact-pieces and to a binding-post 49 on the slate board 10. The purpose of this flexible wire is to allow the said contact-piece to move up and down as the plunger to which it is attached rises or falls.

The distance of the valve-shaped contact-piece 35 from its seat 43 is regulated by the clamp 38 and washers 39, which determine the height of said contact-piece 35 on its rod 36 by the tension of the spiral spring 50 in the tube 31, 32, or 33 and by the height of the nuts 21 on the upper end of the top rod 17, 18, or 19. These distances are to be regulated according to the strength of the current that passes through the coils and according to the weight of the load which the motor has to move. The spring 50 acts as a cushion to relieve the shock on the carbon-contact as the core or plunger is thrown up, and the soft-rubber cushion 22 above the solenoid-casing likewise relieves the shock as the plunger falls after the current has been turned off. The spring also insures a snug connection between the valve-shaped and seat-shaped carbons. I use carbon for this lower connection because I find it is the best substance for the heavy current which passes through it, and I find that a connection in the shape of a valve and seat, as used here, is the most serviceable.

The solenoids are preferably placed side by side on the slate or marble wall-slab, as shown in Fig. 1, and are electrically connected, as shown in the diagram Fig. 2, most of the connecting-wires being attached to the back of the slate or marble slab 10, between it and the wall. The electricity enters my starting apparatus through the wire marked + at the knife-switch E. It passes through the short fuse-wire F, which is between the said switch E and the binding-post 57, to binding-post 58. At this latter binding-post the current is divided into the main current, the course of which is indicated in said diagram by the heavy lines, and the multiple shunt-currents, shown by the light lines. The main current then goes to the three binding-posts 49, which are connected by the flexible wires D with the valve-shaped contact-pieces 35 of the respective solenoids, as before described. The first of the multiple shunt-currents starts in the small wire at binding-post 58 and passes up to the left contact-spring 30 of solenoid 3, through the upper contact-disk 26 of said solenoid to the right contact-spring 30, thence to the lower binding-post 11 of the coil of small wire B of solenoid 1, through said coil B to the upper binding-post 11 of said coil to binding-post 59 below, through the operating-switch G, (which is shown open in the diagram,) and thence connecting with the main outgoing wire at H. It will be noticed that the shunt-current has made a complete circuit, but that the main line is as yet disconnected at the bottom of the first solenoid. The shunt-current in passing through coil B of solenoid 1 will magnetize the core 14 of said solenoid and raise it until it comes in contact with the short core 23. Raising the core 14, however, seats the lower valve-shaped contact 35 in the contact-ring 43 above it, as already described. This will allow the main current to pass from said valve-shaped contact 35 to said contact-ring 43, down to binding-post 60, through the rheostant or resistance J to binding-post 61, up through the coil of large wire A of solenoid 2 to the binding-post 48 on the holder 44 of the contact-ring 43 of said solenoid 2, where it connects with another wire, also attached to said binding-post, then down to binding-post 62, through rheostat K to binding-post 63, up through the coil of large wire A of solenoid 3 to the right, upward and around to the coil A of solenoid 1, and thence back to the right down, and again to the left to binding-post 64, to binding-post 65 on the motor, through brush L, armature M, and brush N of said motor to binding-post 66, also on said motor, to binding-post 67, to binding-post 68, and the current finally leaves through the wire marked —. A short fuse-wire P connects this outgoing wire with the knife-switch E.

The main current in making the circuit just described is divided at binding-post 60 just before it enters the first rheostat J, and part of it is diverted into a shunt-circuit to binding-post 69, through field-coil Q on the left of said motor, through field-coil R on the right of said motor, to binding-post 70, and then to binding-post 66, where it joins the main outgoing current. The purpose of this shunt-circuit is to energize the field-magnets. The core 14 of solenoid 1 being raised, as I have just described, it raises with it the disk-shaped contact-piece 24 until it comes in contact with the upper end of the springs 28. The second one of the multiple shunt-circuits then goes through the coil of small wire B of solenoid 2 up to the right contact-spring 28 of solenoid 1, through said contact-disk 24 to the left contact-spring 28 of said solenoid, thence to the right and down to binding-post 67 on the main outgoing wire. The shunt-current in going through the coil of small wire B of solenoid 2 raises the core 15 of said solenoid upon overcoming the magnetic force created by the main current passing through the coil of large wire A, as already mentioned. Raising the core 15 of this second solenoid seats the valve-shaped contact 35 of said solenoid 2 in its contact-ring 43, and thus short-circuits the main current. The main current now passes from the second binding-post 49 through said valve-shaped and seat-shaped contacts of solenoid 2 to the second binding-post 48, and from there proceeds to the motor, as the main current did before the core 15 of solenoid 2 was raised. It will be noticed that now all those wires have been cut out of the circuit that were included in the main circuit at first, from the second binding-post 49 to the lower connection of the first solenoid, rheostat J, and the coil of large wire A of solenoid 2, down to the second binding-post 48. Raising core 15 of solenoid 2 also raises the disk 25, connected with it above, until it comes in contact with the springs 29, as shown in Fig. 4. This closes the third one of the multiple shunt-currents which goes through the coil of small wire B of solenoid 3 and up through the right contact-spring 29 of solenoid 2, through said disk 25 to the left contact-spring 29 of said second solenoid, and then down to the outgoing wire attached to the left spring 28 of the first solenoid. The electricity passing through the coil of small wire B of solenoid 3 after overcoming the current in series coil A raises the core 16, which, like the core 15 of solenoid 2, has already been magnetically excited by the electricity passing through coil of large wire A of said solenoid 3. Raising the core 16 of solenoid 3 also raises the contact-disk 26, attached to it above, and causes it to assume the position shown by the dotted lines in Fig. 5, thus breaking its connection with the contact-springs 30 on either side of it. The multiple shunt-current being here broken it is is forced up through the lamps S T, which are on a separate wire connected with the first shunt-circuit and act as resistances to reduce the current in the shunt-coils B after the motor is started. The raising of the core 16 of solenoid 3 also acts to raise the valve-shaped contact 35 of said solenoid 3 to its seat, and again the main current is short-circuited. Said main current now passes directly from the first binding-post 49 on the right through the valve-shaped and seat-shaped contact-pieces of solenoid 3 to binding-post 64 to binding-post 65 and to the motor. By raising this last valve-shaped connection to its seat we cut out of the armature-circuit the wires from the first binding-post 49 on the right to the lower contact of solenoid 2, rheostat K, the coil of large wire A of solenoid 3, and the coil of large wire A of solenoid 1.

Thus it will be seen that my invention at first places strong resistances in the path of the current which is delivered to the motor, but by degrees it automatically cuts these resistances out, and this is done by the action of the armature generating its counter electromotive force. When the circuit is first closed by the first plunger and valve-shaped disk, the counter electromotive force in the armature is nothing and the current flowing through the resistances and series coils is maximum. As the armature increases its speed the counter electromotive force increases, and consequently the current is reduced in the resistances and series coils to such an extent that the shunt-coil in the upper part of the second solenoid is more powerful than the series coil in the lower part of the second solenoid. Consequently the plunger in the second solenoid is raised by the shunt-coil and one-half the resistance is cut out. The armature still increases in speed, and still further reduces the current until the third upper shunt-coil gets stronger than the third lower series coil and so raises the third plunger and cuts out all of the resistance and allows the motor-armature to take current direct from the line. The current is thus delivered to the motor in gradually-increased strength. By this means I entirely overcome all jerking and excessive rush of current which is frequently noticeable upon the starting of a motor by an inexperienced person. A current continues to flow through the shunt-circuits in which are placed the small wire coils B and the lamps S T as long as the switch G is closed. As soon as said switch G is opened it stops the current in the coils of small wire B and allows the cores 14, 15, and 16 of the solenoids 1, 2, and 3 to successively resume their normal position of rest, and thus the motor is stopped.

Fig. 8 represents a solenoid of modified construction, which may be used in place of the first of the three solenoids hereinbefore described. It has but one wire coil C, wrapped around a spool 71, that extends the full length of an iron casing made of two parts 6 and 7, like the casing provided for the other solenoids. The other parts of which the solenoid shown in said Fig. 8 is composed are similar in construction to what is shown in Fig. 3, and are indicated by similar numerals. The solenoid in Fig. 8 will perform the same function as is performed by the solenoid represented by said Fig. 3. It is possible thus to use a solenoid with a single coil for the first one of the set of two or more solenoids comprised in the starting apparatus for the reason that when two coils are used in said first solenoid they both act on its plunger in the same way, pulling on it both in the same direction, and of course a single coil can be made to perform the work of the two coils. A two-coil solenoid like that shown in Fig. 3 is preferred, however, as it works better and prevents sparking and injury to the carbon contacts when the first of the multiple shunt-circuits is accidentally or otherwise broken while starting the motor—for instance, by opening the switch immediately after it is closed. In such case the heavy upper coil will not become inactive until the third plunger goes up and short-circuits it. Consequently it will operate to hold up the plungers long enough to avoid a too-sudden parting of contacts, so that no damage will result from the breaking of the circuit.

What I claim, and desire to secure by Letters Patent of the United States, is—

1. The combination with an electric motor and its circuit, of a resistance placed in said motor-circuit, a shunt-circuit and operating-switch therefor, a solenoid forming part of said shunt-circuit and energized thereby, another solenoid having a heavy wire coil in series with said resistance and the armature of the motor and a lighter wire coil in shunt across the line, a plunger moved by the first solenoid, a contact-maker carried by said plunger and arranged, when moved, to close the motor-circuit with the resistance and heavy coil of the other solenoid remaining therein, a plunger in said other solenoid moved by its lighter coil when receiving the electric current from the first solenoid upon the rise of its plunger, and a contact-maker raised by the other plunger and operating to cut out the resistance and heavy wire coil from the circuit of the motor, substantially as set forth.

2. The combination with an electric motor, its circuit, and a resistance arranged to remain in said circuit till after the motor is started, of a shunt-circuit having a resistance in shunt relation to it, a solenoid supplied with electric current from said shunt-circuit, a plunger adapted to be moved by said solenoid, a contact-maker carried by said plunger, another solenoid having a light wire coil in shunt across the line and operated by the first solenoid and plunger and also having a heavier wire coil in series with the resistance in the motor-circuit and the armature of the motor, a plunger moved by the shunt-current flowing through said other solenoid, a contact-maker carried by the latter-named plunger, and electrical connections whereby the closing of the shunt-current will cause the first plunger to rise and its contact-maker to close the motor-circuit, and the raising of the first plunger will cause the other plunger and its contact-maker to cut out the resistance and heavy coil from the motor-circuit and cut in the resistance into the shunt-circuit while the motor is running, substantially as set forth.

3. A motor-starter consisting of two or more solenoids each comprising two coils of wire of different size and each having a plunger and a contact-maker, combined with an electric motor, the motor-circuit, a resistance in said circuit in series with the heavier coils of said solenoids and the motor-armature, a multiple shunt-circuit in which the lighter coils of said solenoids are placed, the heavy coil being farthest away from the contact-maker in the first solenoid and nearest to the contact-maker in the other solenoid or solenoids, and a switch to close the first shunt-circuit and cause the first solenoid to move its plunger and contact-maker, thereby closing the motor-circuit and second shunt-circuit, sending the electric current first through the resistance and heavy coils to the armature, and thereafter energizing the light coil of the other solenoid or solenoids and causing the plunger and contact-maker thereof to remove the resistance from the motor-circuit, substantially as set forth.

4. The combination of a number of solenoids each having two coils of wire of different size, the heavier coil being above the lighter coil in the first solenoid of the series and below the remainder, a plunger under the influence of each solenoid, a ring by each plunger, a valve-shaped contact-maker in movable relation to each ring and adapted to be seated therein, spring-contacts on each solenoid at the opposite end from the ring, a disk in movable relation to the spring-contacts of each solenoid, an electric motor, the motor-circuit, a multiple shunt-circuit, a suitable number of rheostats, electrical connections placing said rheostats in series with the heavy coils of the solenoids, the rings, valve-shaped contact-makers, and the armature of the motor, and also placing the light coils of the solenoids, the spring-contacts and disks in series in the shunt-circuit, and an operating-switch to close the shunt-circuit and cause the current therein to move the several plungers and movable contacts successively, thereby closing the motor-circuit and gradually removing the resistance therefrom, substantially as set forth.

5. The automatic motor-starter herein described, consisting of three solenoids each having a double coil of wire, a heavy coil to be placed in the motor-circuit and a light coil wired to a shunt-circuit, the heavy coil being above the light coil in the first solenoid and under it in the other two solenoids, a movable core within each solenoid, a fixed core in the first solenoid above the movable core in the same, a fixed ring near the lower end of each movable core, a valve-shaped contact adapted to be seated in each ring and carried each by one of the movable cores, contact-springs with their ends bent inward placed above the first and second solenoids and similar springs with their ends bent outward located above the third solenoid, a disk connected with the upper end of the movable core in each of the first and second solenoids and arranged to make contact with the springs thereof when their said core is moved and to be out of contact when at rest, a disk in contact with the springs of the third solenoid when the core thereof is at rest but connected with this core so as to break contact when the same is moved, a resistance, such as one or more lamps, in shunt relation to the spring-contacts of said third solenoid, electrical connections placing the heavy wire coils, rings, and valve-shaped contacts in series with the armature of the motor and suitable resistances in the motor-circuit, and placing the light wire coils, contact-springs, disks, and lamps in multiple series in the shunt-circuit, and means to open and close the shunt-circuit, the whole constructed and operating substantially as described.

6. The combination with an electric motor and its circuit, of resistances in the motor-circuit, a shunt-circuit, and a plurality of electromagnetic devices controlling the resistances, each electromagnetic device having a plurality of coils, one of which is included in the circuit of the motor and another in the shunt-circuit thereof, substantially as described.

7. The combination with an electric motor and its circuit, of resistance in the motor-circuit, a shunt-circuit and switch therefor, a plurality of solenoids having plungers controlling the resistance, said solenoids having coils included in the motor-circuit and coils included in the shunt-circuit, and connections whereby the solenoids are successively operated to vary the resistance of the motor-circuit, substantially as described.

8. The combination with an electric motor and its circuit, of resistance in the motor-circuit, a shunt-circuit and switch therefor, and a plurality of solenoids having plungers controlling the resistance, each plunger being provided with contact devices controlling a terminal of the motor-circuit and a terminal of the shunt-circuit, substantially as described.

9. The combination with an electric motor and its circuit, of resistance in the motor-circuit, a shunt-circuit and switch therefor, and a plurality of solenoids having plungers controlling the resistance, each solenoid having a coil included in the motor-circuit and a coil included in the shunt-circuit and each plunger having contacts controlling a terminal of the motor-circuit and a terminal of the shunt-circuit, substantially as described.

10. A motor-starter comprising a solenoid, a casing therefor, a plunger in said solenoid having a rod extension passing upwardly through said casing, a stop on the plunger-rod above the casing, a fixed contact at the opposite end of said plunger, and a contact-maker adjustably connected with the plunger in movable relation to the fixed contact, substantially as described.

11. A motor-starter comprising a solenoid, a fixed ring-shaped contact, a plunger moved by said solenoid, a cone-shaped contact adapted to be brought to the fixed contact by the plunger, and a spring connection between said plunger and cone-shaped contact, substantially as described.

12. A motor-starter comprising a solenoid, a ring below the same, and a holder for said ring, combined with a plunger passing through said solenoid and ring, and a cone-shaped contact carried by the plunger and seated by the same in the ring, substantially as described.

13. A motor-starter comprising a fixed ring and a solenoid with a movable core having a tubular extension, combined with a cone-shaped contact hung in movable relation to the said ring on a rod entering said tubular extension and held by a spring therein, substantially as described.

Signed by me at San Francisco, California, this 4th day of February, 1899.

ETHELBERT M. FRASER. [L.S.]

Witnesses:
A. H. STE. MARIE,
GEO. T. KNOX.